Figure 3:
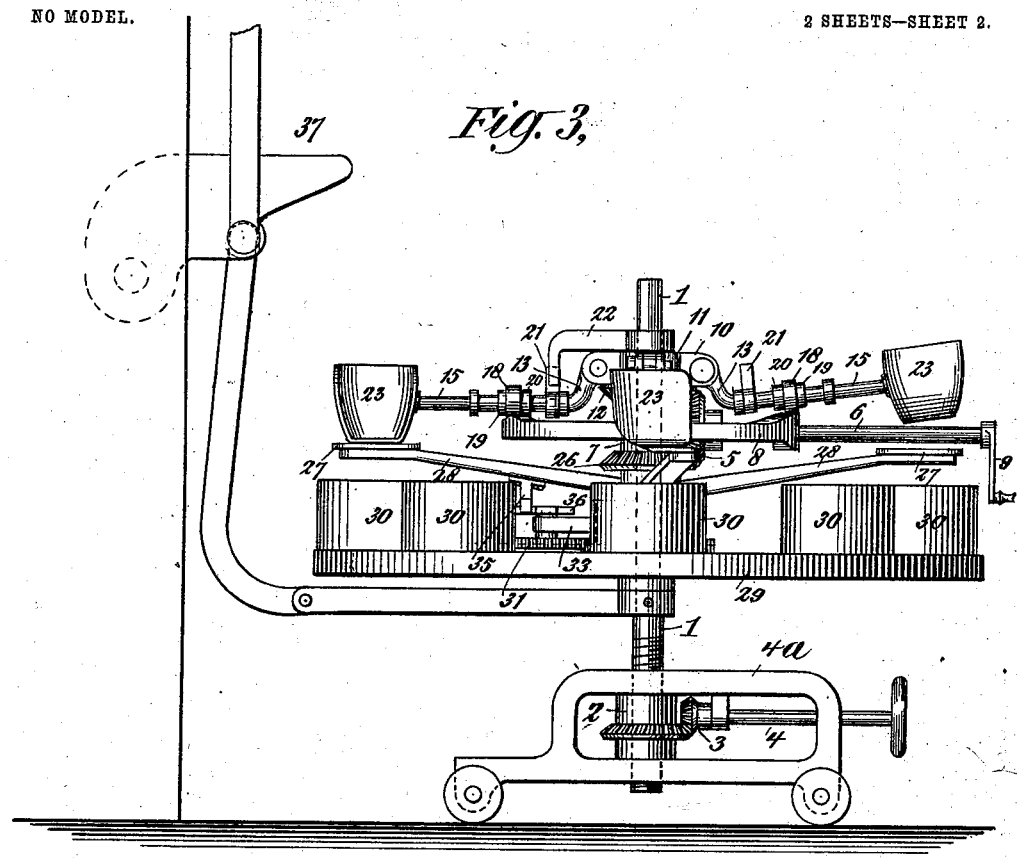

No. 723,983. PATENTED MAR. 31, 1903.
H. BROOKE.
DEVICE FOR CUTTING MOLTEN MATERIAL AND DISTRIBUTING SAME.
APPLICATION FILED MAR. 5, 1898.
NO MODEL. 2 SHEETS—SHEET 1.
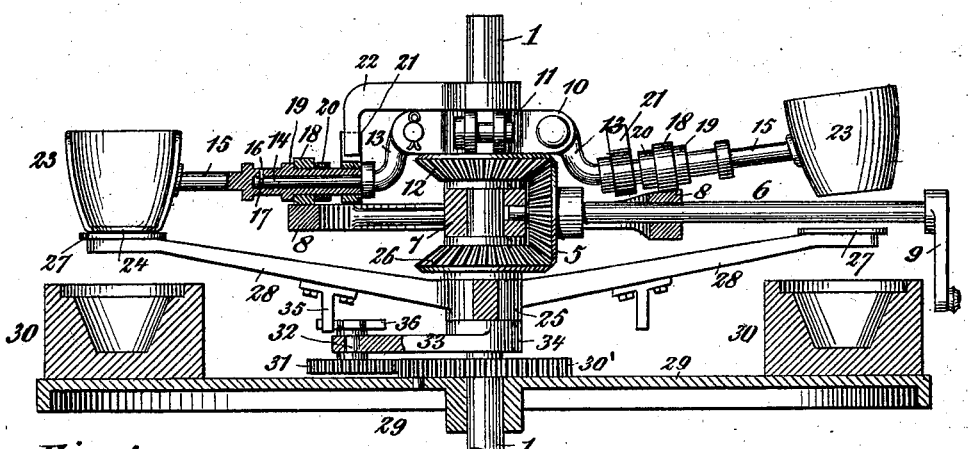
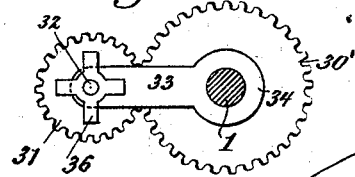
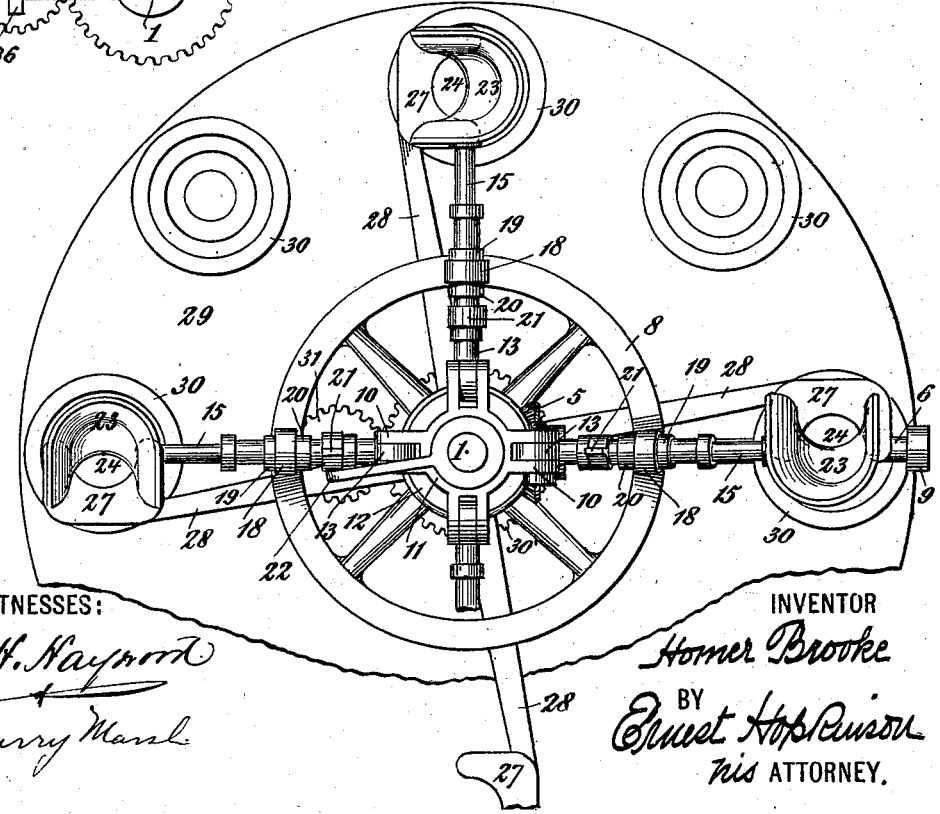
WITNESSES:
O. H. Naynord
Harry Mansl
INVENTOR
Homer Brooke
BY
Ernest Hopkinson
his ATTORNEY.

No. 723,983. PATENTED MAR. 31, 1903.
H. BROOKE.
DEVICE FOR CUTTING MOLTEN MATERIAL AND DISTRIBUTING SAME.
APPLICATION FILED MAR. 5, 1898.
NO MODEL. 2 SHEETS—SHEET 2.

WITNESSES: INVENTOR
Horner Brooke
BY
Ernest Hopkinson
his ATTORNEY.

UNITED STATES PATENT OFFICE.

HOMER BROOKE, OF JERSEY CITY, NEW JERSEY.

DEVICE FOR CUTTING MOLTEN MATERIAL AND DISTRIBUTING SAME.

SPECIFICATION forming part of Letters Patent No. 723,983, dated March 31, 1903.

Application filed March 5, 1898. Serial No. 672,641. (No model.)

*To all whom it may concern:*

Be it known that I, HOMER BROOKE, of Jersey City, in the county of Hudson and State of New Jersey, have invented a new and useful Improvement in Devices for Cutting Molten Material and Distributing the Same, of which the following is a specification.

The present invention relates to devices for cutting or separating molten material, and especially is designed for cutting a stream of flowing molten glass into unformed molten masses of predetermined quantity and distributing the same into suitable receptacles.

The device which is the subject of the present invention is particularly designed for use in connection with an apparatus for flowing molten glass, such as is described and claimed in Letters Patent No. 588,318, granted to me August 17, 1897, and also as described in an application for Letters Patent filed by me February 10, 1898, and serially numbered 669,783. In said patent and application there is described a construction which discharges the molten glass contained in a furnace or other receptacle by flowing the same therefrom by means of a movable conduit or mouth, the flow of the molten glass being controlled by raising or lowering the movable conduit, as particularly described in said patent and application.

In the drawings accompanying the present application I have illustrated a form of construction embodying the features of my invention, in which drawings—

Figure 5:
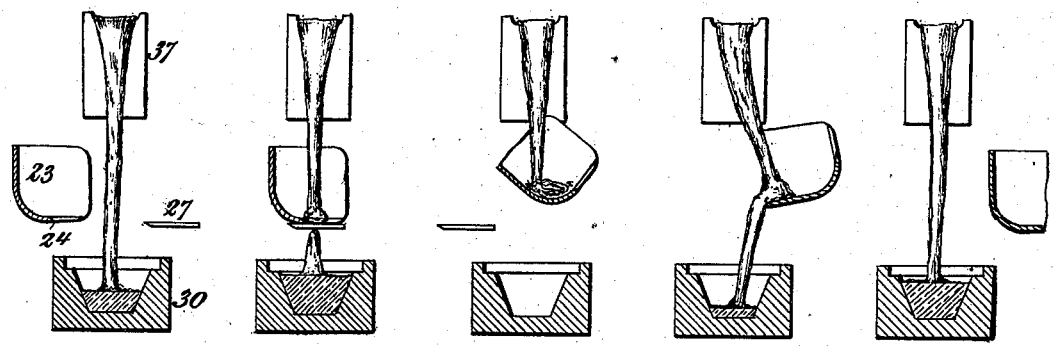

Figure 1 is a view, partly in central vertical section and partly in side elevation. Fig. 2 is a plan view, certain parts being broken away. Fig. 3 is a view in side elevation, showing the device attached to a movable mouth or conduit of a furnace. Fig. 4 is a detail view in plan of the turn-table-operating mechanism. Fig. 5 illustrates diagrammatically the sequence of positions of the cutting-knives and receptacles in the operation of cutting the flowing stream of molten glass.

Like figures of reference refer to like parts throughout the several views of the drawings.

Referring to the drawings in detail, 1 designates a central vertical shaft which is screw-threaded on its lower end. This central shaft is supported in an internally-threaded sleeve 2, carrying a miter-gear meshing with a gear 3 on the end of shaft 4, journaled in the trolley-frame 4ª, which also carries the threaded sleeve 2. The cutting-knives consist of two series, radiating from the central shaft and rotating thereabout in opposite directions. The upper series of knives consist of cup or trough shaped receptacles having a cutting edge and are designed to cut the stream of flowing molten glass and momentarily lift the same and discharge it into a receptacle beneath. The lower series of knives consist of plain flat blades constructed to operate in conjunction with the upper series in the desired manner.

The means which I have shown in the drawings for turning the two series of knives in opposite directions consists of a beveled gear 5, mounted on a shaft 6, said shaft being supported at one end in the hub 7 of a cam-track 8, which hub is secured to the shaft 1. The shaft 6 also has a bearing intermediate its ends in the cam-track 8. Any desired means may be availed of for turning the shaft 6, in the drawings a crank 9 being shown for this purpose.

The upper series of knives are pivoted in brackets 10, extending from a hub 11, which is made integral with or has secured to it a bevel-gear 12, which is in mesh with the bevel-gear 5. Each of the arms (of which I have shown four) of the upper series is constructed as follows: The bent arm 13 is provided with a socket-piece 14, fitting into a socket formed in the arm 15, said piece being secured in any desired manner to the arm 15, so that said arm 15 may oscillate freely thereon, the means shown consisting of a pin 16, projecting through the arm 15 into a groove 17, cut in the socket-piece 14 and extending part way around the same. These parts are supported by a cam-roller 18, suitably secured to the arm 15 by means of a shoulder 19 and a collar 20, said cam-roller resting upon the cam-track 8. The arm 15 carries at its inner end a trip 21, which comes in contact with an arm 22 in its path of revolution, thus oscillating the arm 15 and the cutting-knife carried thereon. The said cutting-knife, secured to the end of arm 15, is shown as consisting of a cup or trough shaped receptacle 23, one side of which is provided with a concave cutting edge 24. It will be apparent, however, that this upper knife may be otherwise constructed.

The lower series of cutting-knives are carried on a hub 25, which has formed integral therewith or secured thereto a beveled gear 26, which meshes with the beveled gear 5, whereby it is driven in an opposite direction to the beveled gear 12, which drives the upper series of knives. Each of the lower series of knives consists of a blade 27, carried on the end of an arm 28, extending from a hub 25.

Beneath the lower series of arms is located a turn-table 29, which carries a number of molds or receptacles 30, which may be designed to give any desired shape to the molten material contained therein or may serve simply as temporary containing devices from which the molten masses may be taken and given final formation by other apparatus. As shown in the drawings, the turn-table is illustrated as being provided with eight of these molds; but it will be evident that any desired number may be placed thereon. This turn-table is designed to have intermittent motion imparted to it, so that the receptacles shall be brought to position underneath the cutting-knives at the proper time to receive the stream of molten glass. The devices shown for imparting this intermittent motion consist of a gear 30', secured to the turn-table, which is driven by a smaller gear-wheel 31, this gear-wheel 31 being secured to a shaft 32, journaled in an arm 33, projecting from a boss or hub 34, secured to the shaft 1. Movement is given to the gear 31 by means of pins 35, engaging a star-wheel 36, secured to the end of the shaft 32, said pins 35 being secured to and projecting downwardly from the arms 28.

The whole apparatus is designed to be moved into and out of operating position relatively to a furnace mouth or conduit, and in the drawings I have illustrated for this purpose the trolley mechanism heretofore described; but any other suitable means of supporting and conveying the cutting device may be availed of. Preferably the parts will be connected to the movable conduit or mouth, connecting-rod 38, secured to the central shaft 1, being shown for this purpose.

The operation of the device will now be apparent. Assuming that the parts are in position as shown in Fig. 3, the conduit 37 will be lowered until the molten glass flows therefrom into one of the receptacles 30. Motion being given to the several parts, the cutting-knives approach each other, as shown in the first position illustrated in Fig. 5, and sever the molten stream, as shown in the second position illustrated in Fig. 5. The next step immediately following the completion of the cutting operation is the rising of the upper cup or trough shaped knife, which movement is imparted to it by the cam-track 8, as illustrated in Fig. 3. Simultaneously with this rising movement of the upper knife it is tilted in a direction opposite to its path of movement by the trip 21 coming in contact with the arm 22. By this rising and simultaneous tilting motion the molten glass is momentarily supported in the cup or trough shaped receptacle while an empty receptacle is being brought to position underneath to receive the molten glass. The tilting of the cup-shaped receptacle also performs the office of leading the cut-off end away from the end into the flow of the molten glass, so that it becomes homogeneous and prevents the shear-marks from showing in the article of glass subsequently formed therefrom. The third of the series of diagrammatic views illustrated in Fig. 5 shows the parts in the position just described, the cup-shaped receptacle or knife being only partially tilted. In the fourth of the series of illustrations the tilting operation has been completed, and the molten glass is discharged from the cup-shaped receptacle into the receptacle underneath. The further operation of the device completely discharges the molten glass from the cup-shaped receptacle, and the same passes away, resuming its normal cutting position by the action of gravity, being constructed so as to do this. The molten glass is now flowing directly into the receptacle, and the next succeeding pair of knives are approaching to repeat the operation just described.

Of course it will be understood that I do not limit myself to the precise construction of devices here illustrated, as I consider myself to be entitled to broadly cover all means for cutting or separating a stream of flowing molten material into unformed molten masses and discharging the cut-off portions.

What is claimed as new is—

1. An automatic device for cutting or separating an unsupported freely-flowing stream of molten material into unformed molten masses, the same comprising a cutting-knife and means for moving the same and means for supporting the severed stream of continuously-flowing material.

2. An automatic device for cutting or separating an unsupported freely-flowing stream of molten material into unformed molten masses of predetermined quantity, the same comprising a cutting-knife and means for moving the same and means for supporting the severed stream of continuously-flowing material.

3. An automatic device for cutting or separating a flowing stream of molten material into unformed molten masses, the same comprising a cutting-knife and means for moving the same, and means for discharging the said molten masses into suitable receptacles.

4. An automatic device for cutting or separating a flowing stream of molten material into unformed molten masses of predetermined quantity, the same comprising a knife and means for moving the same, a plurality of receptacles, and means for discharging the said molten masses into said receptacles.

5. An automatic device for cutting or separating a flowing stream of molten material into unformed molten masses, the same comprising a knife and means for moving the same, a plurality of receptacles, means for discharging the said molten masses into said receptacles, and means for intermittently moving said receptacles into position to receive the cut-off masses.

6. An automatic device for cutting or separating a flowing stream of molten material into unformed molten masses, the same comprising a knife and means for moving the same, and means for causing said cutting device to temporarily support the molten stream.

7. A device for cutting or separating a continuously-flowing stream of molten material into unformed molten masses, means for causing said cutting device to temporarily support the molten stream and then discharge the same into a suitable receptacle, substantially as specified.

8. A device for cutting or separating a continuously-flowing stream of molten material into unformed molten masses, and means for causing said cutting device to rise at the completion of the cutting operation, substantially as specified.

9. A device for cutting or separating a continuously-flowing stream of molten material, the same comprising two coacting cutting devices, one of which is provided with a cup or trough shaped receptacle, and means for causing said cup or trough shaped receptacle to temporarily support the molten stream at the completion of the cutting operation and then discharge the same, substantially as specified.

10. A device for cutting or separating a continuously-flowing stream of molten material, the same comprising two coacting cutting devices moving in opposite directions, one of which devices consists of a cup or trough shaped receptacle provided with a concave cutting edge, substantially as specified.

11. A device for cutting or separating a continuously-flowing stream of molten material, the same comprising two coacting cutting devices, one of which consists of a cup or trough shaped receptacle having a cutting edge, and means for lifting and oscillating said cup-shaped receptacle, substantially as specified.

12. A device for cutting or separating a continuously-flowing stream of molten material, the same comprising two coacting cutting devices, one of which consists of a cup or trough shaped receptacle having a cutting edge, means for lifting and oscillating said cup-shaped receptacle, a series of receptacles for receiving the cut-off portions of the molten stream, and means for intermittently moving said receptacles into position to receive the cut-off portions, substantially as specified.

13. A device for cutting or separating a continuously-flowing stream of molten material, the same comprising two coacting cutting devices, one of which consists of a cup or trough shaped receptacle provided with a cutting edge, means for causing said trough-shaped receptacle to rise and temporarily support the molten stream at the end of the cutting operation, means for moving the cutting devices in opposite directions, a turn-table carrying a series of molds and means for intermittently rotating said turn-table, substantially as specified.

14. A device for cutting or separating a continuously-flowing stream of molten material, the same comprising two cutting-knives moving in opposite directions, a hub to which the upper knife is secured, a cam-track upon which the upper knife rests, a trip secured to said knife whereby it is oscillated, means for moving the two knives in opposite directions, a turn-table carrying a series of receptacles and means for operating said turn-table to intermittently bring the receptacles thereon into position to receive the cut-off portions of the molten stream, substantially as specified.

In testimony whereof I have signed my name to this specification in the presence of two subscribing witnesses.

HOMER BROOKE.

Witnesses:
FREDK. G. FISCHER,
SEABURY C. MASTICK.